Feb. 25, 1969    S. L. LOEWENSTERN    3,429,197
MOTION TRANSMITTING REMOTE CONTROL ASSEMBLY
Filed Aug. 10, 1966
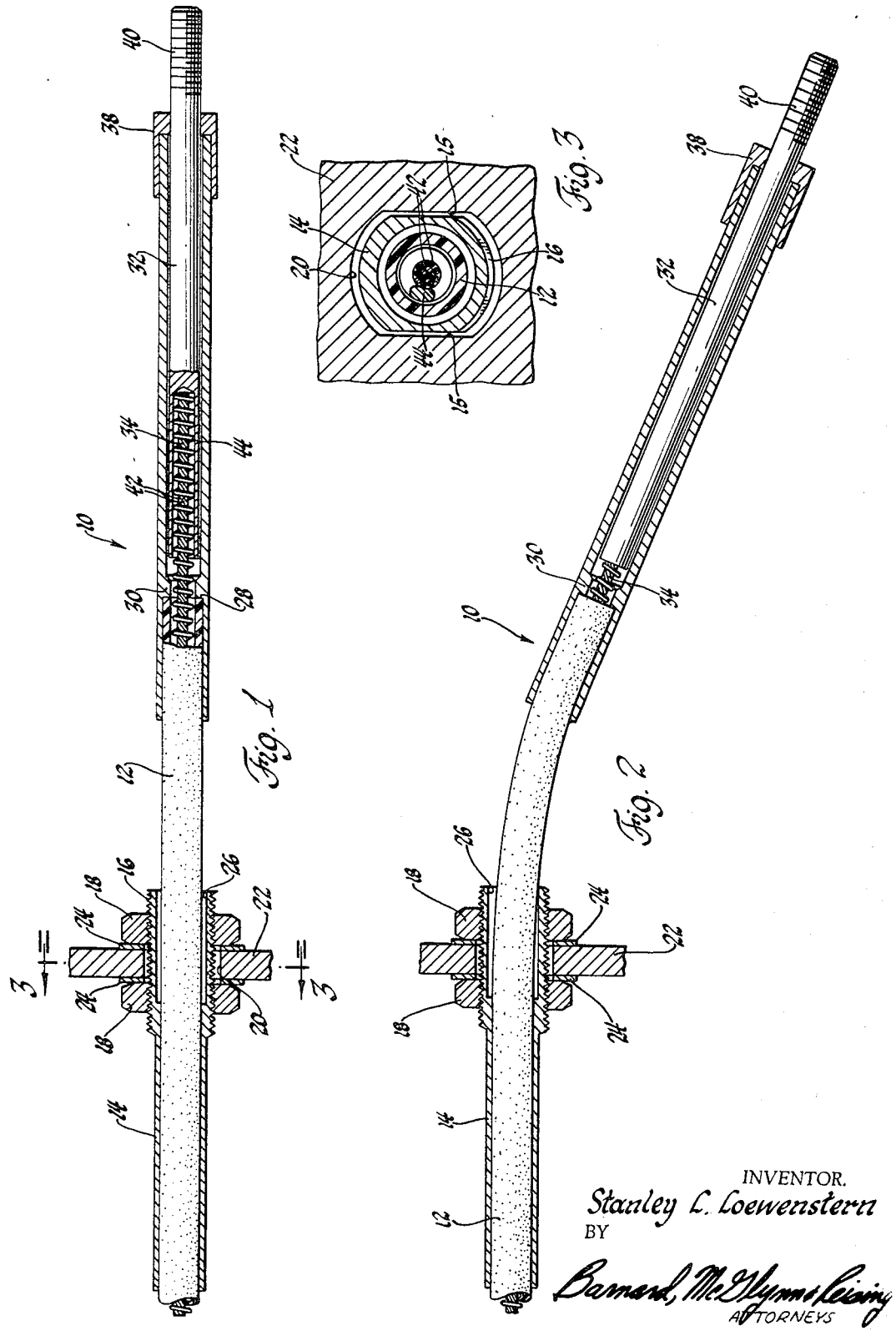
INVENTOR.
Stanley L. Loewenstern
BY
Barnard, McGlynn & Reising
ATTORNEYS United States Patent Office 3,429,197
Patented Feb. 25, 1969

3,429,197
MOTION TRANSMITTING REMOTE
CONTROL ASSEMBLY
Stanley L. Loewenstern, Philadelphia, Pa., assignor to Teleflex Incorporated, North Wales, Pa., a corporation of Delaware
Filed Aug. 10, 1966, Ser. No. 571,561
U.S. Cl. 74—502  6 Claims
Int. Cl. F16c 1/20

ABSTRACT OF THE DISCLOSURE

A motion transmitting remote control assembly including a flexible conduit having first and second ends. A first rigid sleeve is disposed about the conduit adjacent the first end and is remotely spaced from the second end of the conduit. The sleeve is adapted for attachment to a support structure and the conduit extends through the sleeve and away from the sleeve to the first end which is spaced a short distance from the sleeve. A rigid fitting, a movable unsupported sleeve, is secured to the first end of the conduit so that the conduit, between the first sleeve and the unsupported sleeve, is free to bend along the length thereof to allow the unsupported sleeve to move transversely of the longitudinal axis of the first sleeve. A motion transmitting core element is movably disposed in the conduit and has a bar connected thereto slidably disposed in and extending from the unsupported sleeve.

---

This invention relates to a motion transmitting remote control assembly which is operated to control a device by transmitting tension or compression in a curved path by means of a flexible core element.

Remote control assemblies of the instant type are frequently installed so that one end of the conduit is secured to a support structure with the core element movably disposed in the conduit and extending from the end of the conduit and attached to a member which is to be actuated upon movement of the core element. In many instances, the remote control assembly is required to pass through an aperture in a bulkhead. The practice has been to secure the end of the conduit in the aperture in the bulkhead with the core element extending from the end of the conduit to the member to be controlled. Frequently, manufacturing tolerances provide an aperture in the bulkhead which is displaced or misaligned an undesirable amount from the member to be controlled; that is, the member to which the core element is attached is not in line with the longitudinal axes of the core element as it extends from the conduit. In such instances, the core element has a tendency to buckle upon longitudinal movement and/or is forced against the inner diameter of the conduit to create high frictional loads.

It is, therefore, an object and feature of this invention to provide a remote control assembly adapted to be attached to a support structure with the core element attached to a member to be controlled and constructed so that the member to be controlled need not be in line with the support structure, thus allowing large tolerances.

These and other objects and features of this invention may be attained by a preferred embodiment of the instant invention which includes a flexible conduit with a rigid sleeve disposed about the conduit in spaced relation to one end of the conduit. The sleeve is adapted to be secured in an aperture. A rigid fitting is disposed on the end of the conduit in spaced relation to the sleeve so that the conduit may bend or flex along the length thereof between the sleeve and the fitting. A core element is movably disposed in the conduit and is attached at one end to a bar which is slidably disposed in the fitting and extends from the fitting for attachment to an element to be controlled. Thus, the flexibility of the conduit between the fitting and the sleeve allows the bar to be attached to a member to be controlled when the member to be controlled is offset from the aperture or other support structure, and without requiring the end fitting to be attached to a support structure.

Other objects and attendant advantages of the present invention will be readily appreciated as the same becomes better understood by reference to the following detailed description when considered in connection with the accompanying drawings wherein:

FIGURE 1 is a side elevational view partially broken away and in cross section of a preferred embodiment of the instant invention;

FIGURE 2 is a view similar to FIGURE 1 but showing the assembly in another position; and FIGURE 3 is an enlarged fragmentary cross-sectional view taken substantially along line 3—3 of FIGURE 1.

Referring now to the drawings, wherein like numerals indicate like or corresponding parts throughout the several views, a motion transmitting remote control assembly is shown generally at 10.

The assembly includes a flexible conduit 12. The flexible conduit 12 is a tubular member of organic polymeric material, such as polyethylene, nylon, or the like. Alternatively, the conduit 12 may include an inner tubular member of organic polymeric material surrounded by a plurality of wires wound helically on a long lead and an organic polymeric casing surrounding the wires; an example of such a conduit is illustrated in assignee's U.S. Patent 3,063,303, which issued Nov. 13, 1962.

A first rigid sleeve 14 is disposed about and secured to the conduit 12 by swaging, by an adhesive, or in any other appropriate manner. The rigid sleeve 14 is preferably made of metal and has threads 16 about a first end. The threads 16 coact with the nuts 18 to secure the sleeve 14 in an aperture 20 in a bulkhead 22. The washers 24 are disposed between the respective nuts 18 and the bulkhead 2. The sleeve 14 has an enlarged inner diameter 26 at the first end thereof to provide space about the conduit 12 so that the conduit 12 is free to move transversely of its longitudinal axis. The conduit 12 may move in a radial direction until it contacts the inner diameter 26 as illustrated in FIGURE 2.

As is illustrated in FIGURE 3, the sleeve 14 has a pair of parallel flat sides 15 which coact with a specially shaped aperture 20 to prevent rotation of the sleeve 14 when it is secured in the aperture by the nuts 18. The conduit 12 extends from the other end of the sleeve 14 (to the left as illustrated) to a remote position.

The conduit 12 also extends from the other end of the sleeve 14 to a first end 28. A rigid fitting or a movable unsupported sleeve 30 is secured to the end 28 of the conduit 12. The fitting 30 is swaged or adhesively secured to the conduit 12, and may be secured to the conduit 12 in any other appropriate manner. The fitting 30 is disposed in spaced relation to the sleeve 14 so that the conduit 12 is free to bend along the length thereof between the sleeve 14 and the fitting 30 to allow the fitting 30 to move transversely of its own longitudinal axis, an example of such a position being illustrated in FIGURE 2.

A bar 32 is slidably disposed in the fitting 30 and is attached to the motion transmitting core element 34 by swaging, or the like. The core element 34 is movably disposed in the conduit 12 and extends from the end 28 of the conduit 12 and into the fitting 30 where it is secured to the bar 32. The bar 32 is slidably disposed in the fitting 30 and extends through a cap 38 which is disposed on the end of the fitting 30. The bar 32 is preferably threaded at 40 for attachment to an element to be controlled.

The core element 34 comprises a plurality of metal strands 42 wound together on a long lead and a wire 44 helically wound thereabout on a short lead.

The sole support for the end of the conduit, therefore, is the sleeve 14 since the fitting 30 is not secured to a support structure and is movable with the bar 32 so that the bar 32 may be attached to a member to be controlled and the member to be controlled need not be aligned with the aperture 20 in the bulkhead 22 because the rigid fitting 30 slidably supports the bar 32 to prevent buckling and the length of conduit between the sleeve 14 and the fitting 30 allows the assembly to flex so that the member to which the bar 40 is to be attached may be disposed in various positions relative to the aperture 20 in the bulkhead 22. In addition, the bar 32 may be attached to a pivoting lever, crank, or the like, which moves through an arc since the flexibility of the conduit between the sleeve 14 and the fitting 30 allows the bar to move back and forth as the lever or crank pivots through its arc of travel.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly comprising; a flexible conduit having first and second ends, a first rigid sleeve disposed about said conduit adjacent said first end and remotely spaced from said second end, said first sleeve including means for attachment to a support structure, said conduit extending through said first sleeve and away therefrom to said first end which is spaced from said first sleeve, a rigid movable unsupported sleeve secured to said first end of said conduit and disposed in spaced relationship to said first sleeve so that said conduit is free to bend along the length between said first sleeve and said unsupported sleeve to allow said unsupported sleeve to move transversely of the longitudinal axis of said first sleeve, a flexible motion transmitting core element movably disposed in said conduit and extending between said first and second ends thereof, and a rigid bar extending from said unsupported sleeve and connected to said core element and slidable in said unsupported sleeve.

2. An assembly as set forth in claim 1 wherein the end of said first sleeve closest to said unsupported sleeve is radially spaced from said conduit for allowing said conduit at that position to move transversely of the longitudinal axis of said first sleeve.

3. An assembly as set forth in claim 1 including means for securing said first sleeve in an aperture.

4. An assembly as set forth in claim 3 wherein said means includes threads about a first end of said first sleeve for receiving a pair of threaded nuts.

5. An assembly as set forth in claim 4 wherein said first sleeve includes at least one flat portion for coaching with the aperture to prevent rotation of said sleeve when secured in the aperture.

6. An assembly as set forth in claim 5 wherein said first sleeve includes at least one flat portion for coacting first end thereof to provide space about said conduit so that said conduit is free to move transversely of its longitudinal axis.

References Cited

UNITED STATES PATENTS

| | | | |
|---|---|---|---|
| 1,580,877 | 4/1926 | Barber | 74—501 |
| 1,590,724 | 6/1926 | Caretta | 74—502 |
| 1,862,105 | 6/1932 | Wharem | 74—501 X |
| 2,132,919 | 10/1938 | Arens | 74—502 |
| 2,746,355 | 5/1956 | Wells | 74—491 |
| 3,063,303 | 11/1962 | Cadwallader | 74—501 |
| 3,143,994 | 8/1964 | Morse. | |
| 3,289,491 | 12/1966 | Conrad | 74—501 |

FRED C. MATTERN, Jr., *Primary Examiner.*

CAROLYN F. GREEN, *Assistant Examiner.*